United States Patent

[11] 3,587,862

[72] Inventor Graham Lee
 Stamford, Conn.
[21] Appl. No. 871,724
[22] Filed July 24, 1969
[45] Patented June 28, 1971
[73] Assignee Dorr-Oliver Incorporated
 Stamford, Conn.
 Continuation of application Ser. No.
 532,988, Mar. 9, 1966, now abandoned.

[54] ROTARY TABLE FILTER APPARATUS
 8 Claims, 9 Drawing Figs.
[52] U.S. Cl. .................................................. 210/330,
 210/345, 210/395
[51] Int. Cl. ....................................... B01d 35/12,
 B01d 33/24

[50] Field of Search.......................................... 210/(Digest
 12), 395, 330, 142, 332, 345, 396

[56] References Cited
 UNITED STATES PATENTS
 2,818,177 12/1957 Richards ........................ 210/390
 3,015,397 1/1962 Schwartz........................ 210/395

*Primary Examiner*—Frank A. Spear, Jr.
*Attorneys*—Theodore M. Jablon, William J. Fox and Domonic M. Mezzapelle ABSTRACT: A rotary table filter wherein the stationary annular valve member is surrounded by an annular support construction having an annular base member supporting the annular track bearing for the filter table, an annular shelf member surrounding the annular valve member, and radial spider arms rigidly connecting said annular base member with said annular shelf member, with access to the inner and the outer peripheries of the cooperating annular valve faces.

INVENTOR.
GRAHAM LEE
BY
Theodore M. Jablon
ATTORNEY.

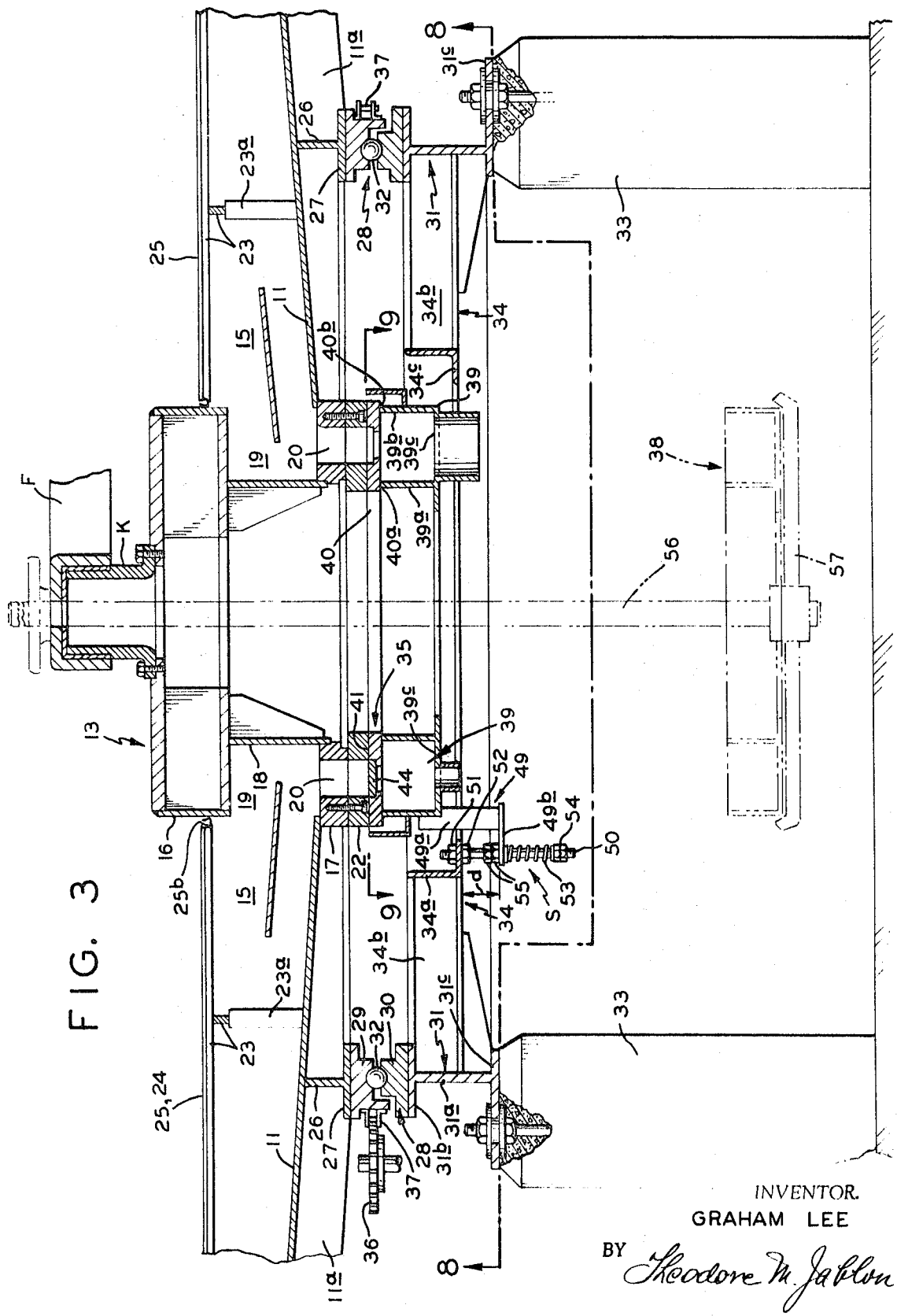

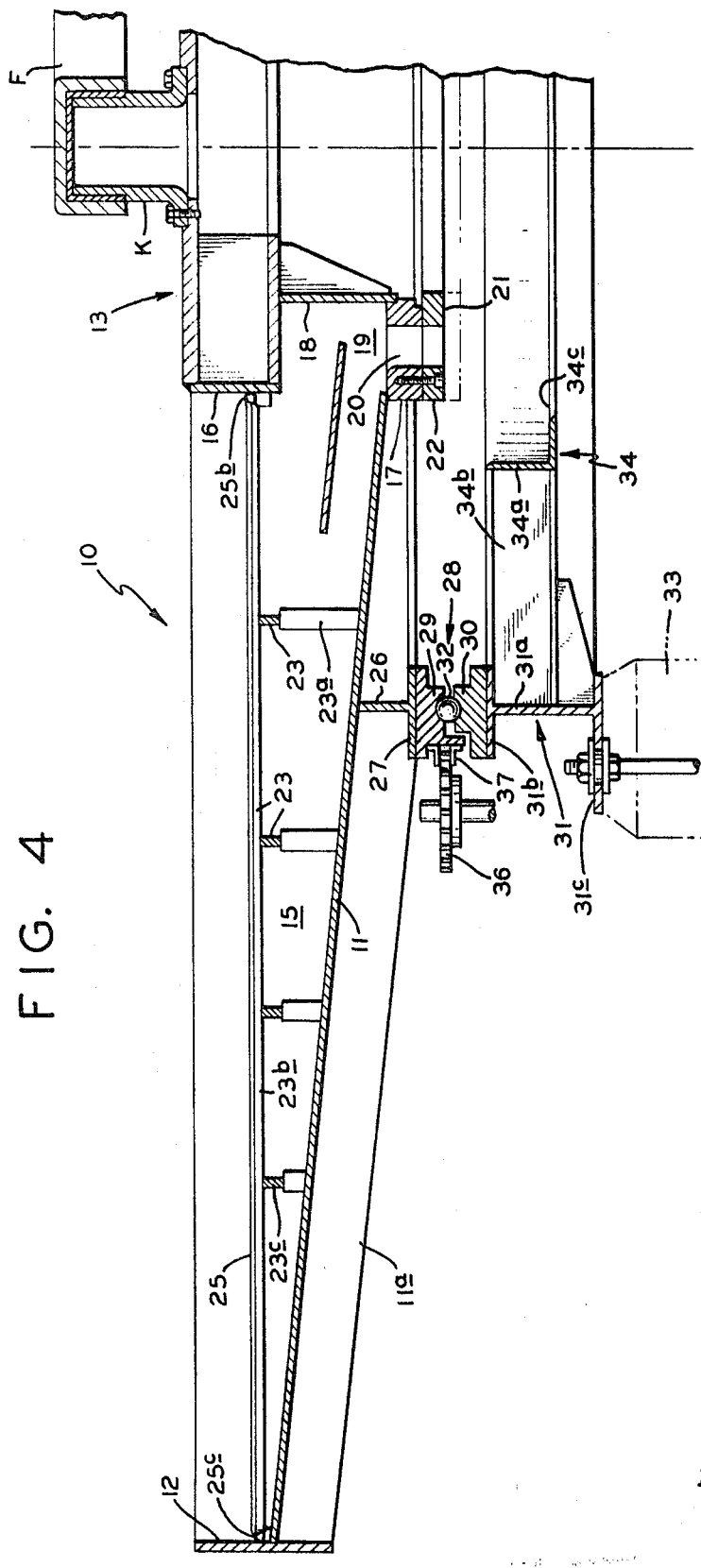

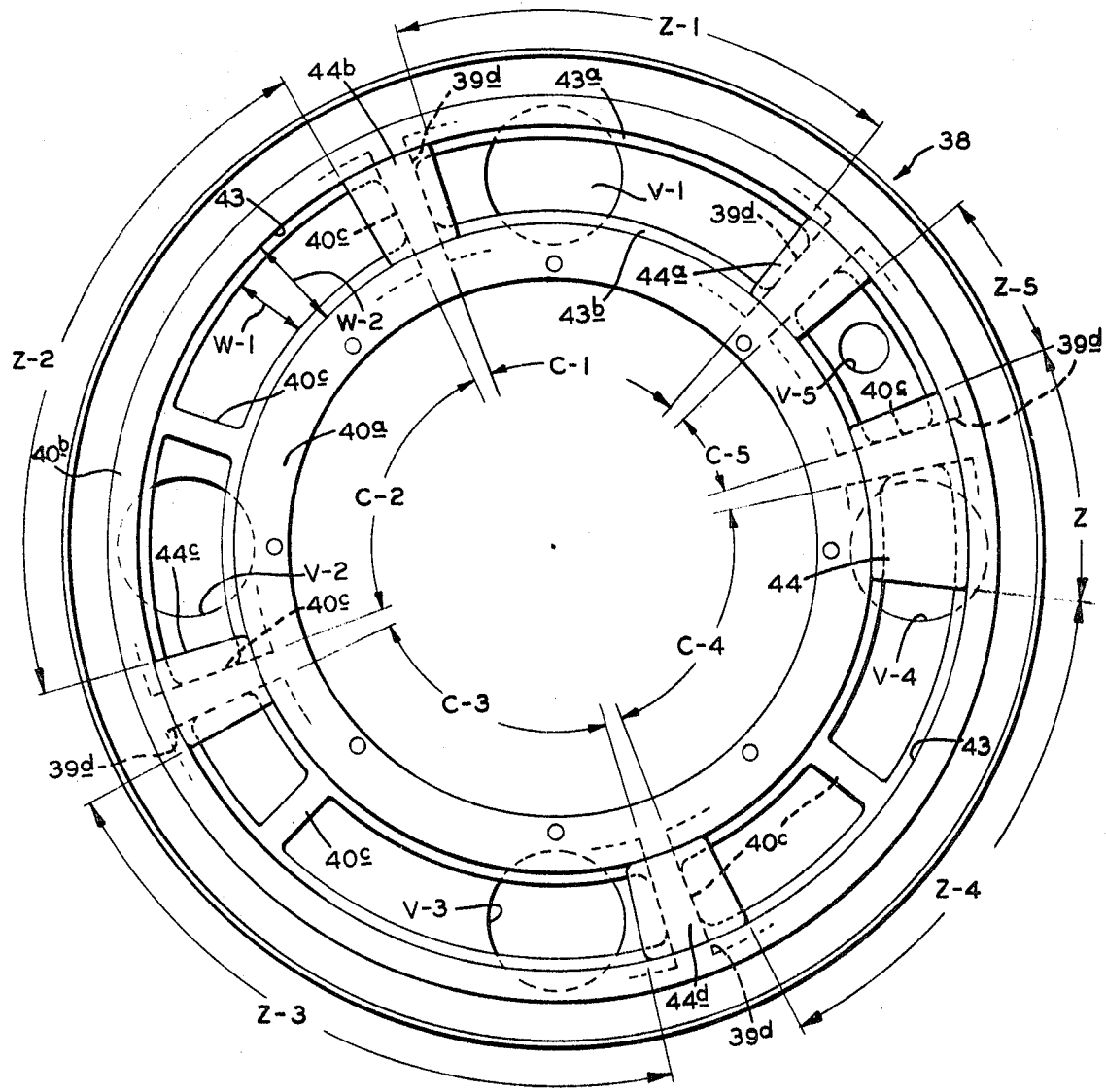

ROTARY TABLE FILTER APPARATUS

This is a continuation of Ser. No. 532,988, filed Mar. 9, 1966, now abandoned.

This invention relates to continuous rotary table filters, and more particularly to improvements in the construction and arrangement of the annular filter valve disposed at the underside of the rotary filter table concentric therewith and effective to control the filtration cycle incident to the rotation of the filter table.

The filter table or horizontal tray structure is subdivided into sector-shaped individual filtration chambers adjoining one another around a central hub portion or center island portion which is part of the rotating table structure. The lower end portion of the center island has filtrate discharge openings for the respective filtration chambers, arranged in a circle around the vertical axis of rotation. The center island portion, herein briefly termed "center island," presents a horizontal machined bottom face interrupted by the discharge openings, which bottom face should be parallel to the plane of the filter media mounted on said chambers, as well as parallel to the operating plane of an annular support bearing for the filter table.

The underside of the center island is face to face with the machined top side of an annular stationary valve body constructed and arranged to cooperate with the filtrate discharge openings so as to automatically control the filtration cycle incident to the rotation of the filter table.

The filtration cycle may comprise a pulp feeding and filtration zone wherein filter cake is formed under vacuum, followed by a cake-washing zone under vacuum, and a cake discharge zone under neutral pressure, which may have a discharge scroll for effecting cake removal. Separate vacuum receivers may be connected to the stationary valve body, communicating with respective vacuum zones of the filtration cycle. This valve body is surrounded by an annular bearing of large diameter for rotatably supporting the filter table and providing an adequate antitilting base therefor. This bearing is mounted on a base ring member supported on piers affording access to the underside of the table filter.

One object of the invention is to overcome in a simple manner problems of supporting and readily adjusting the stationary valve body for maintaining it in cooperative relationship with the rotary filter table. Especially for large filter tables and correspondingly large valve diameters, there has been no satisfactory solution of the problem to meet certain valve-operating conditions. One condition requires carefully adjusted rubbing contact valve operation. Another condition requires carefully adjusted valve clearance operation. Furthermore, the valve body should be readily accessible and dismountable for inspection and overhaul and for refacing.

The foregoing objects of the invention are attainable by the provision of stationary support structure built around the annular valve body, and a plurality of adjustable supporting or suspension devices spaced around the valve body, for adjustably supporting or suspending the valve body from respective anchoring points on the surrounding support structure. The supporting or suspension devices may be adjustable to allow for either valve rubbing contact or for valve clearance operation.

A simple and economical support structure according to the invention comprises the existing pier-supported base ring member to which is added auxiliary structure extending inwardly rigidly therefrom, and providing the locality for the supporting points for the adjustable valve suspension devices. A simple yet very strong horizontal annular frame construction for this purpose comprises an outer ring member, such as the base ring member, an inner ring member concentric therewith, and horizontal radial members rigidly interconnecting the two ring members, with the valve body supported by the suspension devices from the surrounding inner ring member, and thus freely accessible, adjustable, and dismountable for inspection or refacing.

Other features and advantages will hereinafter appear.

As this invention may be embodied in several forms without departing from the spirit or essential characteristics thereof, the present embodiment is considered to be illustrative and not restrictive.

FIG. 3 is an enlarged partial vertical sectional view of the center portion of the machine taken on line 3-3 in FIG. 2, including the center island portion of the filter table, and the associated stationary valve body with surrounding support frame construction therefor.

FIG. 4 is an enlarged partial vertical sectional view of the machine taken on line 4-4 in FIG. 2, clearly showing the valve support structure, omitting the valve body itself and the suspension devices therefor.

FIG. 5 is an enlarged detail section taken on line 5-5 in FIG. 2, showing the mounting of the filter media.

FIG. 9 is a detail cross-sectional view taken on line 9-9 of FIG. 3, upon the top face of the annular valve body.

Figure 1:
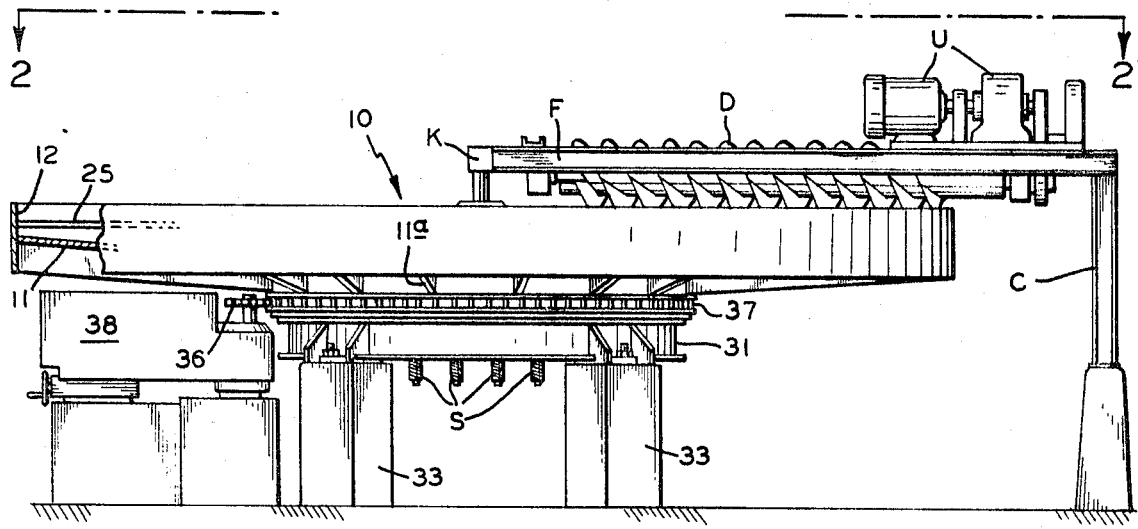
FIG. 1 is a side view of a rotary table filter embodying the invention.
Figure 2:
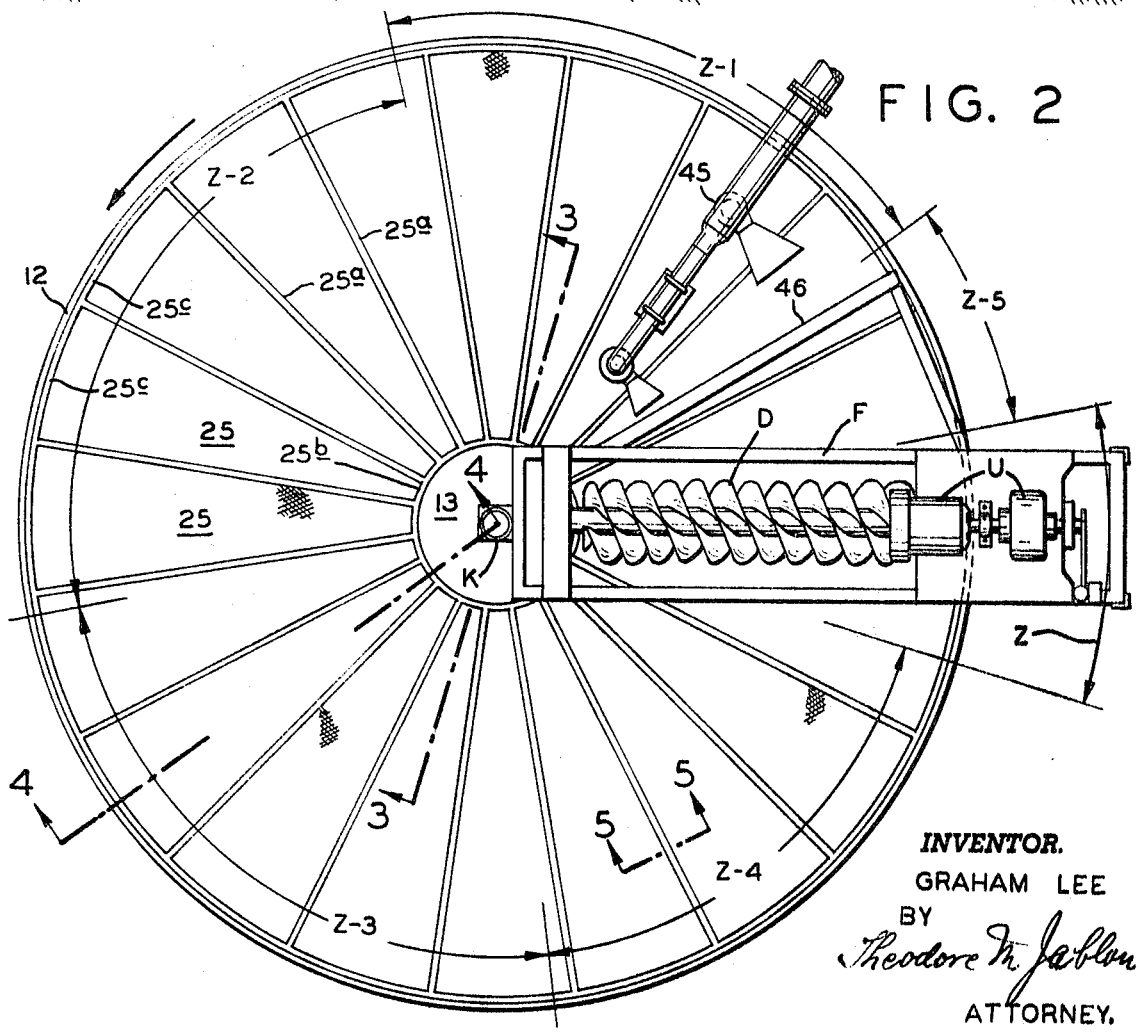
FIG. 2 is a plan view of the machine taken on line 2-2 in FIG. 1.

In the type of table filter herein shown as an example, the filter table tray structure 10 comprises a shallow conical tray bottom 11 provided at the underside with radial reinforcing ribs 11a, an outer vertical cylindrical boundary wall 12, and a central hub portion or center island 13. The annular filtration space of the tray structure surrounding the center island and peripherally defined by the cylindrical boundary wall 12, is subdivided by radial partition walls 14 defining individual sector-shaped filtration chambers 15.

The center island portion 13 of the filter table has an annular horizontal top portion 16, an annular bottom or ring portion 17, an intermediate constricted portion 18. The constricted portion or hollow cylindrical wall rigidly interconnects the portions 16 and 17 concentric therewith. The portions 16, 17, and 18 thus form an annular recess 19 in the island 13. The radial partition walls 14 of the filter table extend into this annular recess, and are sealingly welded to the center island along the contour lines a, b, c thereof.

Figure 7:
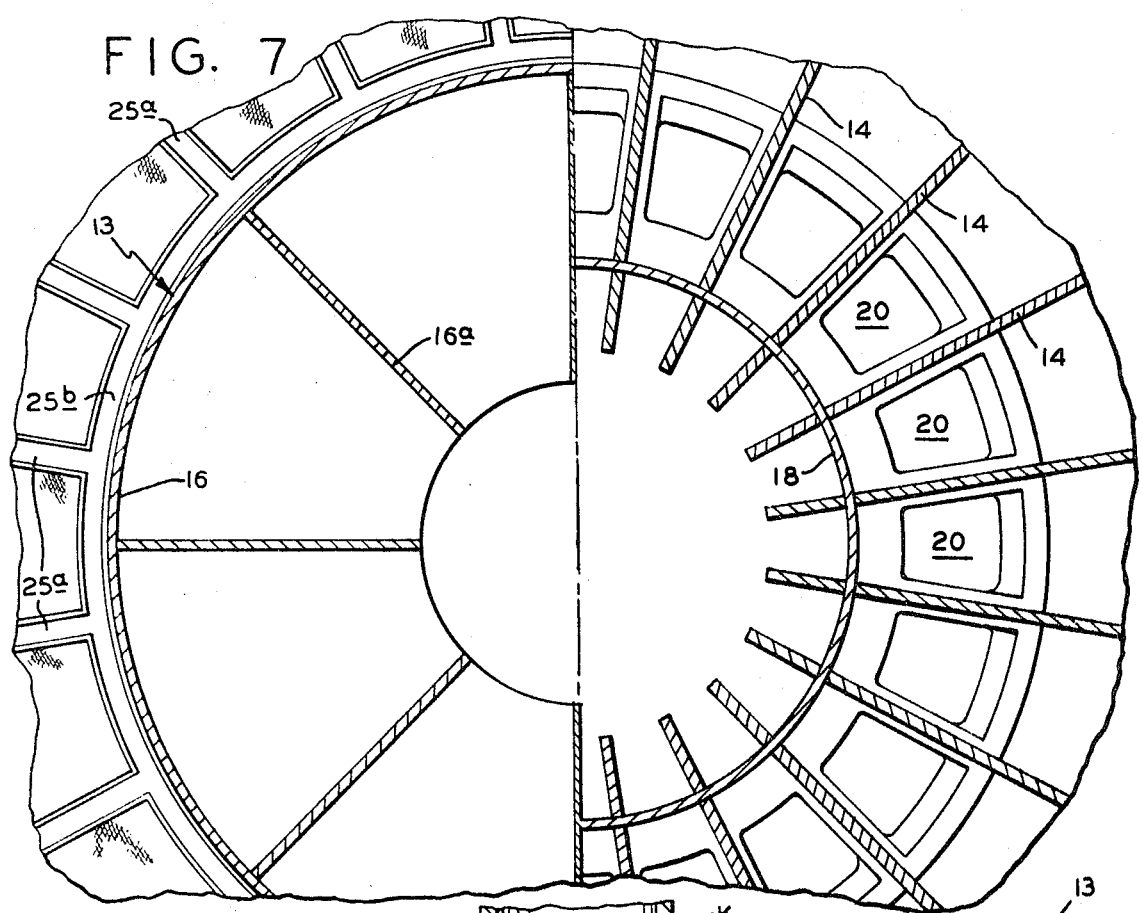
FIG. 7 is a cross-sectional view of the center island portion, taken on line 7-7 in FIG. 6.
Figure 6:
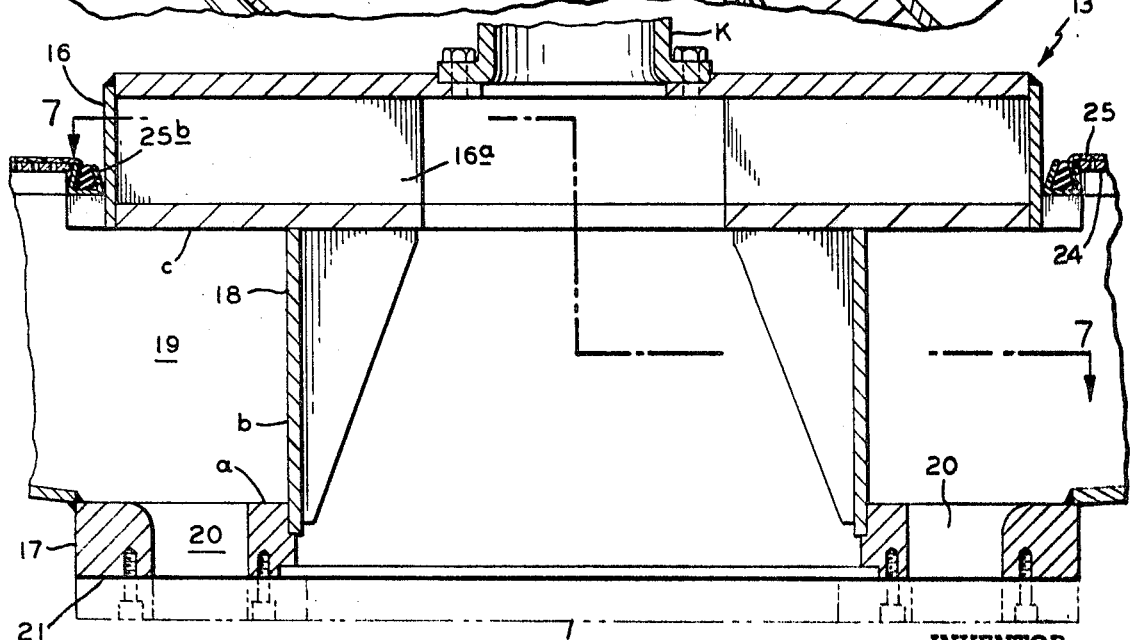
FIG. 6 is an enlarged vertical sectional view of the center island portion of the filter table, taken from FIG. 3.

Filtrate discharge openings 20, one for each filtrate chamber (see also FIGS. 6 and 7), are provided in ring portion 17 of the center island, which has a machined bottom face 21. A correspondingly apertured annular wear plate 22 having machined parallel top and bottom faces is detachable fastened to the bottom face 21.

Each of the sector-shaped filtration chambers of the tray structure is provided with a horizontal grid structure 23 connected to the radial partitions 14 and further supported on posts 23a. The grid structure comprises transverse grid members 23 and 23c welded to the associated radial partitions and having horizontal top edges machined so as to be coplanar with the top faces of the partitions. These top edges and top faces define a horizontal plane 21a (see FIG. 6) parallel to the machined bottom face of the center island. Fixed to the top edges of the transverse grid members are radial grid member 23b which in turn support a perforated backing plate or panel 24 (see FIG. 6) for filter media 25 which thus also have a common horizontal plane parallel to the bottom face 21 of the center island.

The radial edges of the filter media are fastened in well-known radial sealing groove or channel members, the so-called divider strips 25a (see FIG. 5) fixed to the top faces of respective radial partition walls, and having top edges coplanar with the top face of the backing plates. The arcuate end edges of the media are fastened in corresponding arcuate sealing groove or channel members 25b and 25c (see FIGS. 2, 3, 4, and 7) which are coplanar with the radial divider strips.

A well-known cake discharge scroll D continuously removes the filter cake radially outwardly from the filter table. The scroll is mounted for rotation in a horizontal frame F which also carries the motorized drive unit U therefor. The outer end of the frame is supported by a structure C, while the inner end rests upon the rotating center island and is held in centered position thereon by a well-known pivot bearing K coaxial with the axis of rotation.

The tray structure has fixed to the bottom side thereof a concentric rim 26 of inverted T-shaped cross section. Through the bottom flange 27 of this rim the filter table is supported upon an annular bearing 28 of a diameter large enough to provide a secure antitilting base for the filter table.

The bearing has an upper bearing race 29 fastened to the horizontal bottom flange 27 of the rim, and a lower bearing race 30 fastened to the top face of a stationary base ring member 31, with antifriction members 32 effective between the bearing races. The base ring member of generally I-shaped cross-sectional configuration is shown to consist of a vertical cylindrical web portion 31a, a horizontal top flange 31b connected to lower bearing race, and a horizontal bottom flange 31c anchored to piers 33. The bearing is mounted so that its horizontal operating plane is parallel to the bottom valve face 21 of the filter table, and consequently also parallel to the plane of the filter media above.

Means for rotating the filter table on the bearing, comprise a drive sprocket 36 engaging an endless chain 37 fitted around the upper bearing race 29 and connected thereto so as to constitute therewith in effect a large driven sprocket gear unitary and concentric with the filter table. Motor and drive gear means for driving sprocket 36 are indicated at 38 in FIG. 1.

A stationary annular valve body 35 (see FIG. 3) must be supported and is to be maintained in carefully adjusted cooperative relationship with the bottom face of the center island portion of the filter table, and thus with the filtrate discharge openings therein, for automatically controlling the filtration cycle incident to the rotation of the filter table.

According to the invention and in a preferred embodiment thereof, an auxiliary support structure 34 extends horizontally inwardly from the base ring member 31 for supporting the valve body 35. The support structure comprises an auxiliary ring member 34a of angle profile with a horizontally inwardly extending shank, closely surrounding the valve body 35 substantially concentric therewith. Radial horizontal members 34b rigidly interconnect the two concentric ring members so as to constitute therewith a rigid composite annular support construction extending substantially in a horizontal plane. A plurality of suspension devices S are spaced around the valve body 35 for adjustably supporting the valve body from the auxiliary ring member 34a in a manner furthermore to be explained below.

The valve body 35 itself (see FIGS. 3 and 9) comprises an annular trough 39 having an inner cylindrical wall 39a, an outer cylindrical wall 39b, and an annular flat bottom 39c. Radial partitions 39d divide this trough into arcuate sections or compartments, the number and arrangement of such compartments being governed by the requirements of the filtration cycle. In the present embodiment five such partitions are provided, defining four compartments C-1, C-2, C-3, C-4 (see FIG. 9) for maintaining the sequence of vacuum-operated phases of the filtration cycle, namely filtration, first wash, second wash, and drying respectively, and a fifth compartment C-5 (see FIG. 9) supplied with air pressure for the blowback phase.

The four vacuum-operated compartments have respective bottom connections V-1, V-2, V-3, V-4 with respective vacuum receivers (not shown). The fifth compartment has an air pressure supply connection V-5.

The valve body 35 further comprises an annular flat ring member 40 concentric with the trough and sealingly welded at 40a and 40b to the top edges of the cylindrical walls thereof. The ring member 40 has a machined horizontal top face 41 mated with the bottom face of annular wear plate 22.

Referring particularly to FIGS. 3 and 9 the ring member 40 comprises an inner annular portion 40a and an outer annular portion 40b (see FIG. 3) both rigidly interconnected by relatively narrow radial webs 40c integral therewith (see FIG. 9). In other words, the annular portions of ring member 40 have between them an open annular space indicated by its width W-1, and interrupted only by the narrow radial webs. It is to be noted that some of these webs 40c coincide with, and close tightly upon the respective radial partitions 39d in the trough, so there will be no short circuiting between the arcuate compartments. Countersunk in the top face of ring member 40 concentric therewith is a machined shallow annular groove 43 indicated by its width W-2 which is somewhat greater than the width W-1 of the arcuate openings, and thus providing annular shoulders 43a and 43b opposite to each other and in a common horizontal plane with the top face of the radial webs.

Arcuate bridging members or blank-off blocks 44, 44a, 44b, 44c, and 44d, are slidably fitted into the shallow groove and seated on the shoulders 43a and 43b thereof. These blocks have a machined top face accurately flush with the adjacent top face of ring member 40, and they may be slid to suitable positions in the groove and held in place in their adjusted position by suitable detention or securing means not shown. The effective arcuate length of these blank-off members and their adjusted positions in the annular valve body establish and automatically control a required filtration cycle which of itself is well known in the art.

Figure 8:
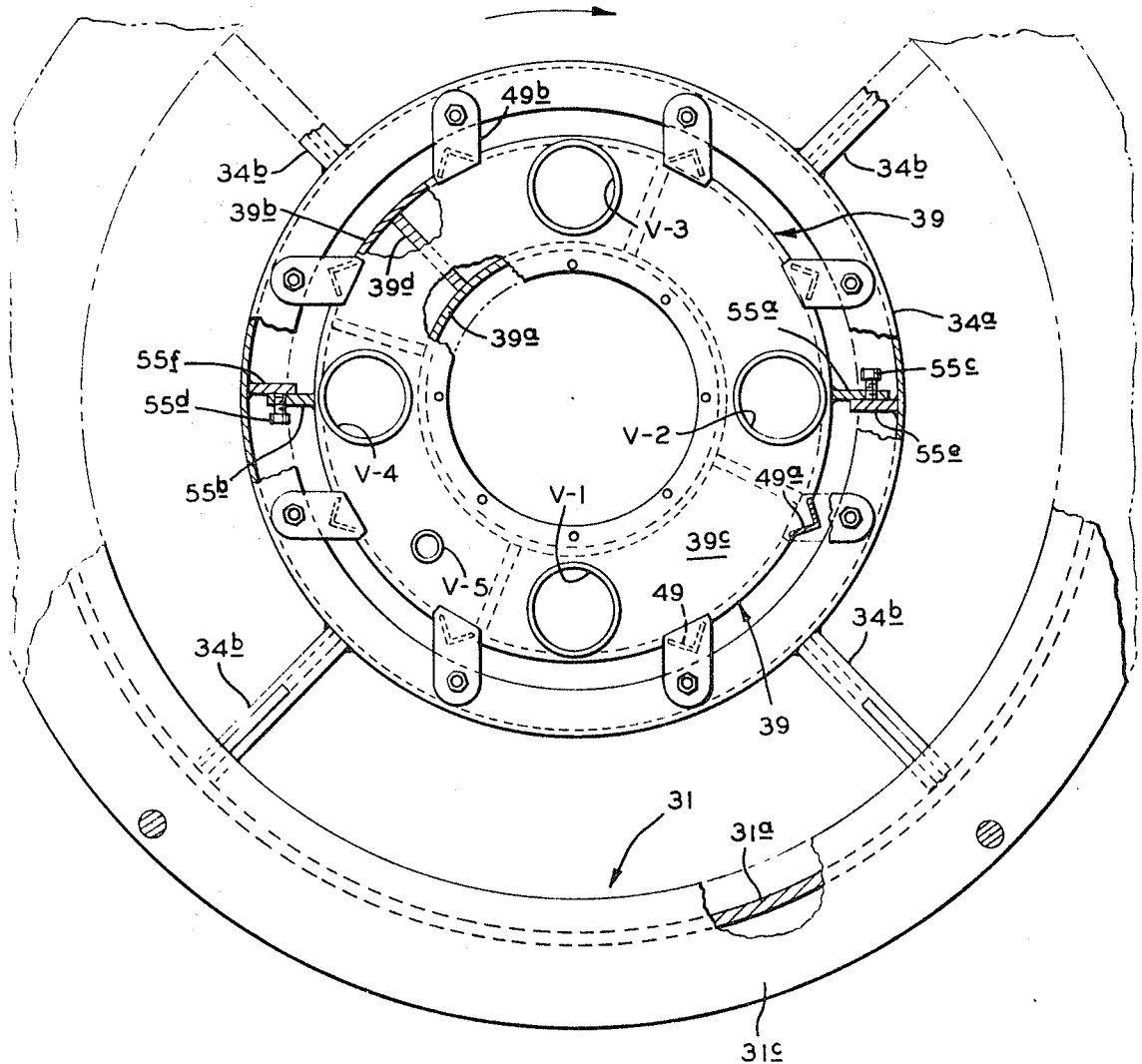
FIG. 8 is a bottom view of the machine taken on line 8-8 of FIG. 3, showing the annular valve body and support structure therefor.

The filtration cycle (see FIGS. 2 and 9) may comprise a slurry-filtering zone Z-1 supplied from a slurry supply pipe 45 where filter cake is formed upon the filter media under vacuum effective through a neck V-1 (see FIG. 8), a first cake washing zone Z-2 under vacuum effective through a neck V-2, a second cake washing zone Z-3 under vacuum effective through a neck V-3, a drying zone Z-4 under vacuum effective through a neck V-4, a neutral zone Z for cake discharge by the scroll, and a back-blow zone Z-5 for loosening and mixing residual cake material on the filter media, back-blow air pressure for this purpose being supplied through neck V-5. A radial feed baffle 46 is effective between the back-blow zone Z-5 and the initial slurry-filtering zone Z-1 of the filtration cycle (see FIG. 2).

The annular valve body 35 just described has fixed or welded to its outer wall and spaced along the periphery thereof a plurality of brackets 49 (see FIG. 3) supporting the valve body from the surrounding annular composite support frame structure through the aforementioned suspension devices S. The brackets comprise a vertical downwardly extending leg portion 49a and a horizontal shelf or foot portion 49b at the lower end thereof.

The shelf portion extends outwardly parallel to and spaced a distance d below the bottom face of auxiliary ring member 34a. The vertical suspension devices S comprise a threaded rod 50 depending from ring member 34a and having its upper end held rigidly connected therewith as by means of locking nuts 51 and 52.

The valve brackets 49 rest upon compression coil springs 53 surrounding the respective threaded rods, each spring being confined between a respective shelf portion 49b and locknuts 54 on the lower end portion of the respective threaded rod. When valve clearance operation is desired, the springs are allowed to urge the valve body upwardly against adjustable stops provided by intermediate locknuts 55 engaging the respective threaded rods. When these locknuts are properly set and secured, on each rod, they insure the desired operating clearance for the valve body held against the stops by the springs aided by the atmospheric pressure sustaining the valve body from below. When rubbing contact valve operation is desired, the intermediate nuts or stops 55 are moved upward on the threaded rod and out of contact with the respective shelf or foot portions 49b. This leaves the springs free to urge the valve body upwardly into rubbing contact with the rotating filter table. Adequate upward spring pressure may be insured by setting the locknuts 54 upwardly upon the lower end portion of the threaded rod.

For securing the valve body 35 against rotation by the filter table (see FIG. 8), the valve body has fixed thereto a pair of diametrically opposed outwardly directed lugs 55a and 55b provided with set screws 55c and 55d engaging corresponding inwardly directed lugs 55e and 55f fixed on the auxiliary ring member 34a.

From the foregoing it will be seen that this invention presents a highly practical as well as economical solution to the problem of valve support for large table filters, by utilizing the base ring member 31 as part of a composite annular support structure for the valve body. The valve body is resiliently cradled in the surrounding support structure by the suspension devices S. The suspension devices are thus freely accessible for effecting the required adjustments, be it for rubbing contact or clearance operation of the valve. The invention also allows the valve body itself to be easily dismounted and lowered freely through the central open area of the support structure into the ample unobstructed space below, the height of which is determined by the height of the piers.

Prior to lowering the valve body it is only necessary to remove the locknuts 54 from the lower ends of the threaded rods, and then have suitable jack devices conveniently lower the valve body into the unobstructed space below. A convenient way of so lowering the valve as indicated in dot-and-dash in FIG. 3, is by means of a screw spindle 56 and spider 57 supported from the center island of the filter table. Remounting the valve body in the proper operating relationship with the filter table is an equally simple procedure. In this way, the downtime of the filter may be minimized for inspection and refacing at required intervals.

Furthermore, it is seen that the annular support structure for the suspension devices S is effective to support the annular track bearing means as well as the annular valve member, while providing operating space externally as well as internally of the annular area of the valve body, thus rendering accessible the inner and the outer peripheries of the cooperating valve faces as well as the valve-positioning means S.

It will be understood that each of the elements, or two or more together, of the apparatus herein described, may also find useful application in table filters differing from the type described above. Furthermore, while the invention has been illustrated and described as embodied in a table filter having a resiliently supported stationary annular valve body, it is not intended to be limited to the details shown, since various modifications and structural changes may be made without departing from the spirit of the present invention.

I claim:

1. In a rotary table filter the combination which comprises a rotary filter table structure having a center island and sector-shaped filtration chambers arranged around the center island and providing a horizontal plane of filter media, said center island having an annular bottom portion provided with filtrate discharge openings for the respective filtration chambers, and also having a valve bottom face, annular track bearing means for the filter table structure, of a diameter substantially greater than said center island concentric therewith, and providing an antitilting base, said bearing means being in a plane parallel to said valve bottom face, and comprising an upper annular bearing race member fixed to the underside of the table structure, a lower stationary bearing race member, and antifriction bearing elements between said upper and lower bearing race members, a stationary annular valve body having a valve top face cooperating with said valve bottom face of the center island, said annular valve body surrounding a relatively unobstructed open area, an annular base member supporting said annular track bearing means concentric therewith, a generally annular valve support structure surrounding said annular valve body, which support structure in turn comprises said annular base member, an annular bracket member surrounding said annular valve body in concentrically spaced relationship therewith, and in turn surrounded by said annular base member in concentrically spaced relationship therewith, radial spider members rigidly interconnecting said annular bracket member and the surrounding annular base member, said radial spider members provided with open areas therebetween, a substantial number of vertical guide rods extending rigidly downwardly from said annular bracket member spaced around said annular valve body, and complementary bracket means extending radially outwardly from said annular valve body and in cooperative relationship with said guide rods, and positioning means effective between said guide rods and said complementary bracket means to maintain said valve faces in cooperative relationship with one another when said annular valve body is in position relative to said support structure, said annular support structure being constructed and arranged so as to provide operating space and accessibility around, below, and within the area of, said annular valve body, thus rendering accessible the inner and the outer peripheries of the cooperating valve faces, as well as said positioning means.

2. The table filter according to claim 1, wherein said annular bracket member comprises a vertical cylindrical portion fixed to the inner ends of said radial spider members, and an annular shelf portion extending inwardly from the lower edge of said vertical portion, and having said guide rods extending downwardly therefrom and through said complementary bracket means.

3. The table filter according to claim 1, wherein said complementary bracket means comprise a downwardly directed rod, and a shelf portion extending outwardly from the lower end of said leg and into cooperative guide relationship with said rod.

4. The table filter according to claim 1, wherein each guide rod has a threaded lower end and wherein said positioning means comprise a compression coil spring surrounding the lower end portion of said rod, and confined between said complementary bracket means and stop means provided on said lower threaded end.

5. The table filter according to claim 4, with the addition of intermediate locknuts upon said rods providing adjustable upward stop means engaged by said complementary bracket means to determine an operating clearance between said cooperative valve faces.

6. The table filter according to claim 4, wherein said complementary bracket means comprise a downwardly directed leg associated with each respective downwardly directed rod, and a shelf portion extending outwardly from the lower end of said leg and into cooperative guide relationship with said rod.

7. The table filter according to claim 1, wherein said annular bracket member comprises a vertical cylindrical portion fixed to the inner ends of said radial spider members, and an annular shelf portion extending inwardly from the lower edge of said vertical portion, wherein said vertical guide rods are directed downwardly from said annular shelf portion said rods having threaded end portions, with upper locknuts fixing the upper end portion to said shelf portion, a compression coil spring surrounding the lower end portion, and lower locknuts upon the lower end confining said spring between said lower end and said annular shelf portion.

8. The table filter according to claim 1, wherein said annular base member comprises a cylindrical intermediate body portion, a bottom flange portion, and a top flange portion, and wherein said radial members extend from said cylindrical portion of the annular base member.